(12) United States Patent
Tomizawa et al.

(10) Patent No.: US 6,500,070 B1
(45) Date of Patent: Dec. 31, 2002

(54) COMBINED GAME SYSTEM OF PORTABLE AND VIDEO GAME MACHINES

(75) Inventors: Toshikazu Tomizawa, Kyoto (JP); Akio Ikeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/572,845

(22) Filed: May 18, 2000

Related U.S. Application Data
(60) Provisional application No. 60/178,328, filed on Jan. 27, 2000.

(30) Foreign Application Priority Data
May 28, 1999 (JP) ............................................. 11-150114

(51) Int. Cl.[7] ........................... A63H 13/00; G06F 17/00
(52) U.S. Cl. .............................. 463/43; 463/44; 463/45; 463/1; 463/30
(58) Field of Search ............................. 463/30, 31, 37, 463/40–44, 45, 47; 273/148 B, 148 R

(56) References Cited

U.S. PATENT DOCUMENTS

| | | |
|---|---|---|
| 4,072,310 A | 2/1978 | Beam |
| 4,168,796 A | 9/1979 | Fulks et al. |
| 4,572,509 A | 2/1986 | Sitrick |
| 4,695,946 A | 9/1987 | Andreasen et al. |
| 4,858,930 A | 8/1989 | Sato |
| 4,905,280 A | 2/1990 | Wiedemer |
| 5,043,887 A | 8/1991 | Richardson |
| 5,048,831 A | 9/1991 | Sides |
| 5,119,295 A | 6/1992 | Kapur |
| 5,184,830 A | 2/1993 | Okada |
| 5,240,249 A | 8/1993 | Czarnecki et al. |
| 5,343,461 A | 8/1994 | Barton et al. |
| 5,349,689 A | 9/1994 | Suzuki |
| 5,350,176 A | 9/1994 | Hochstein et al. |
| 5,367,394 A | 11/1994 | Chuter et al. |
| 5,393,072 A | 2/1995 | Best |
| 5,393,073 A | 2/1995 | Best |
| 5,396,225 A | 3/1995 | Okada |
| 5,408,408 A | 4/1995 | Marsico, Jr. |
| 5,428,528 A * | 6/1995 | Takenouchi et al. ........ 364/410 |
| 5,440,565 A | 8/1995 | Miyamoto et al. |
| 5,581,712 A | 12/1996 | Herrman |
| 5,618,045 A | 4/1997 | Kagan et al. |
| 5,702,305 A | 12/1997 | Norman et al. |
| 5,727,170 A | 3/1998 | Mitchell et al. |
| 5,759,100 A | 6/1998 | Nakanishi |
| 5,762,555 A | 6/1998 | Crump et al. |
| 5,795,228 A | 8/1998 | Trumbull et al. |
| 5,828,862 A | 10/1998 | Singkornrat et al. |
| 5,876,351 A | 3/1999 | Rohde |

(List continued on next page.)

FOREIGN PATENT DOCUMENTS

| | | |
|---|---|---|
| GB | 2 232 087 A | 12/1990 |
| GB | 2 287 629 A | 9/1995 |
| JP | 4123119 | 4/1992 |
| JP | 4-266781 | 9/1992 |
| JP | 6-61390 | 8/1994 |
| JP | 411226257 A | 4/1999 |
| WO | WO98/11692 | 3/1998 |

Primary Examiner—Valencia Martin-Wallace
Assistant Examiner—Alex F. R. P. Rada, II
(74) Attorney, Agent, or Firm—Nixon & Vanderhye P.C.

(57) ABSTRACT

A combined game system includes a plurality of portable game machines and a video game machine. The portable game machines are connected to the video game machine through communication cables, and the video game machine is in turn connected to a display. Each portable game machine has an LCD and an operating device to process a unit according to key input information to the operating device and a program of a portable game. The LCD displays a discrete picture based on the unit information. Simultaneously, the unit information is transmitted to the video game machine. The video game machine processes the unit information based on which a common picture is displayed on the display.

8 Claims, 11 Drawing Sheets

U.S. PATENT DOCUMENTS

| | | |
|---|---|---|
| 5,951,462 A | 9/1999 | Yamanaka |
| 5,971,855 A | 10/1999 | Ng |
| 5,976,015 A | 11/1999 | Seelig et al. |
| 5,991,530 A | 11/1999 | Okada et al. |
| 5,991,839 A | 11/1999 | Ninomiya |
| 6,007,428 A | 12/1999 | Nishiumi et al. |
| 6,009,538 A | 12/1999 | Goodwin, III et al. |
| 6,042,476 A | 3/2000 | Ohashi et al. |
| 6,042,478 A | 3/2000 | Ng |
| 6,056,640 A | 5/2000 | Schaaij |
| 6,071,194 A | 6/2000 | Sanderson et al. |
| 6,083,104 A | 7/2000 | Choi |
| 6,085,268 A | 7/2000 | Lee et al. |
| 6,098,138 A | 8/2000 | Martinelli et al. |
| 6,115,765 A | 9/2000 | Lee |
| 6,123,619 A * | 9/2000 | Tokita et al. .................. 463/1 |
| 6,126,547 A | 10/2000 | Ishimoto |
| 6,132,315 A * | 10/2000 | Miyamoto et al. ............ 463/43 |
| 6,135,887 A | 10/2000 | Pease et al. |
| 6,139,434 A | 10/2000 | Miyamoto et al. |
| 6,145,035 A | 11/2000 | Mai et al. |
| 6,165,068 A | 12/2000 | Sonoda et al. |
| 6,168,524 B1 | 1/2001 | Aoki et al. |
| 6,238,291 B1 * | 5/2001 | Fujimoto et al. ............. 463/44 |

\* cited by examiner

FIG. 12
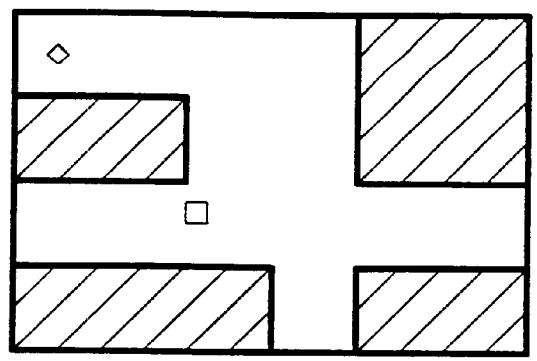
(A)
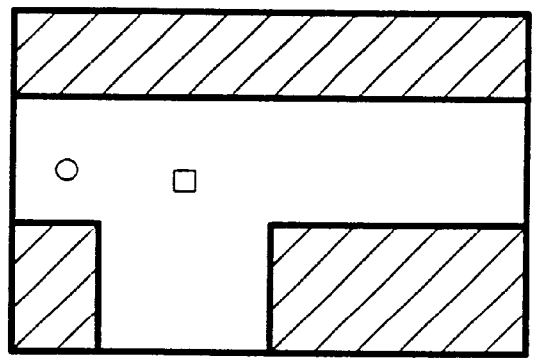
(B)
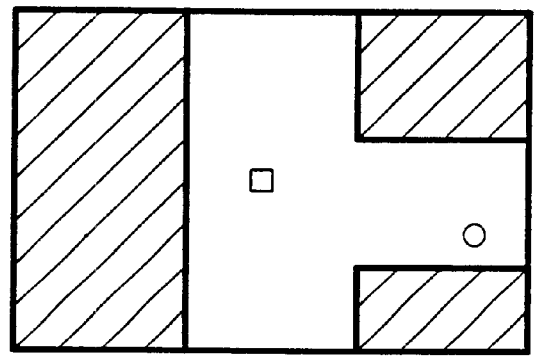
(C)
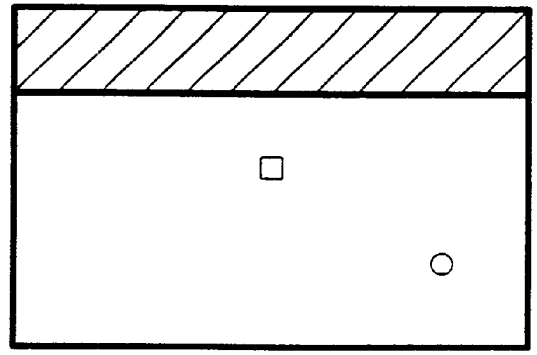
(D)

COMBINED GAME SYSTEM OF PORTABLE AND VIDEO GAME MACHINES

This application claims the benefit of U.S. Provisional Application No. 60/178,328 filed Jan. 27, 2000, the entire contents of which is hereby incorporated by reference in this application.

BACKGROUND OF THE INVENTION

1. Field of the invention

This invention relates to combined game systems. More particularly, the invention relates to a novel combined game system having a plurality of portable game machines each having a discrete display and connected to a video game machine in connection with a display, thereby enabling a common interactive game to play on these portable and video game machines.

2. Description of the Prior Art

There are game systems using portable and other video game machines as disclosed in a first prior art (Japanese Patent Laid-open No. H4-266781; corresponding U.S. Pat. No. 5,393,073) and a second prior art (Japanese Patent Laid-open No. S60-119977).

Meanwhile, the second prior art discloses a game system having a slave unit connected to a master so that a game program for the slave can be executed by the master, thereby displaying the slave's game on a master's larger display screen.

However, the first prior art provides for nothing more than displaying a branch message on the portable game machines to allow an option thereof on the portable game machines. Accordingly, such a game cannot be played on the portable game machines that the portable game machines are allowed to independently proceed the game while administered by the video game machine (hereinafter referred to as "interactive game").

Also, in the second prior art the master merely performs a role of the slave, and hence does not allow an interactive game to play on the slave and master.

SUMMARY OF THE INVENTION

It is therefore a primary object of the present invention to provide a novel combined game system.

Another object of the invention is to provide a combined game system of a portable and video game machines enabling an interactive game to play thereon.

A combined video game system according to a first invention is a combined game system connected through connection means with a video game machine connected to a common display and portable game machines having a discrete display, the portable game machine comprising: an operating means for outputting an operation signal depending upon an operation for a game; first game program storing means storing a game program of an own portable game; first processing means for generating first display data to be displayed on the discrete display based on an output of the operating means and the portable game program, and for processes unit information required for an interactive game with the video game machine; and transmitting/receiving means for transmitting and receiving the unit information to and from the video game machine; the video game management comprising: second game program storing means storing an operation program for the video game machine and a program for the interactive game; temporary storage means for temporarily storing unit information transmitted to and receiving from the portable game machine through the connection means and the transmitting/receiving means, and an output of the operating means; and second processing means for generating second display data to be displayed on the common display based on the program stored in the second game program storing means, and generating display data for the interactive game to be displayed on the common display, in response to the unit information stored in the temporary storing means and received from the portable game machine and an output of the operating means of the portable game machine; and wherein the video game machine and the portable game machines interact to execute one interactive game.

A combined game system according to a second invention is a combined game system connected, through connection means, with a video game machine having a first storage medium storing a first game program and connected to a display and portable game machines of two or more in number having a second storage medium storing a second game program, the video game machine including a first processor to process program stored in the first information storage medium and a first data storage means; the portable game machine including a second processor to process a program stored in the second information storage medium, second data storage means and operating means; the first information storage medium including at least, a first program of storing a display control program to display a game picture which is to be displayed on the display by the video game machine and is common between the portable game machines; a second program of storing transfer control program to transfer data to and from the portable game machines; and a third program of storing write program to temporarily store data transferred from the portable game machines to corresponding areas in the first data storage means to the portable game machines; the second information storage means storing a fourth program of storing an operation state determining program to determine an operation state based on an operation of the operating means; a fifth program of storing a display control program to display a game picture to be displayed on the portable game machines based on an operation state determined by the fourth program; and a sixth program of storing a transfer control program to perform data transfer to and from the video game machine; and wherein the video game machine and the portable game machines can interact to execute an interactive game.

In the first invention, the video game machine is connected to a common-pictured display while the portable game machines have respective discrete-pictured display. If the operating means of the portable game machine is operated, an operation signal is transmitted to the first processing means. The first processing means processes each unit according to the operation signal and portable game program. Specifically, calculation is made for each unit to move or act according to the operation signal, obtaining unit information. Meanwhile, the portable game machines display respective discrete pictures, and causes the transmitting/receiving means to transmit unit information to the video game machine. The video game machine stores the unit information received from the portable game machines into the temporary storing means. According to the unit information, the second processing means architects a common picture and displays it on the common display.

Where a plurality of portable game machines are connected to the video game machine, each player operates the operating means of his or her portable game machine whereby the video game machine processes a unit concerned. That is, both the common picture and the discrete pictures of the portable game machines are varied in accordance with operation of the operating means. The common display displays a common picture to provide common information between the players while the discrete displays each display a related discrete picture to one player with secrecy.

The temporary storing means of the video game machine is formed with a discrete storage area for the portable game machine, in order to temporarily store therein the unit information processed by the second processing means and to be transmitted to each portable game machine and/or the unit information received from each portable game machine.

In the second invention, a first storage medium such as a game cartridge is loaded onto the video game machine while second storage mediums are loaded onto the video game machines. The first processor of the video game machine processes a first program thereby displaying a common game picture between the portable game machine on the display. The first and second processor execute a second program and a sixth program. This transmits an operation state of the operating means of the portable game machine to the video game machine, and the unit information changed depending on the operation state is sent back to the portable game machine. Consequently, the execution of a fifth program by the second processor provides display of a discrete picture according to the unit information sent back from the video game machine. Meanwhile, the execution of the first program by the video game machine provides display of a common picture on the display. In this manner, one interactive game can be executed by interaction between the video game machine and the portable game machines.

According to the present invention, one interactive game can be enjoyed on the combined game system of the portable and video game machines. In such a case, the discrete picture displayed on the discrete display on the portable game machine is secretive to other players. The common display displays information permitted to be known to other players while the discrete displays display discrete pictures not to be known to the other players. This makes it possible to enjoy such an interactive game as a card game, horse race game, or other role playing games, in a competitive fashion.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 12 is an illustrative view showing examples of display pictures on each portable game machines in the FIG. 2 embodiment.

DETAILED DESCRIPTION OF THE PREFERRED EMBODIMENTS

Figure 1:
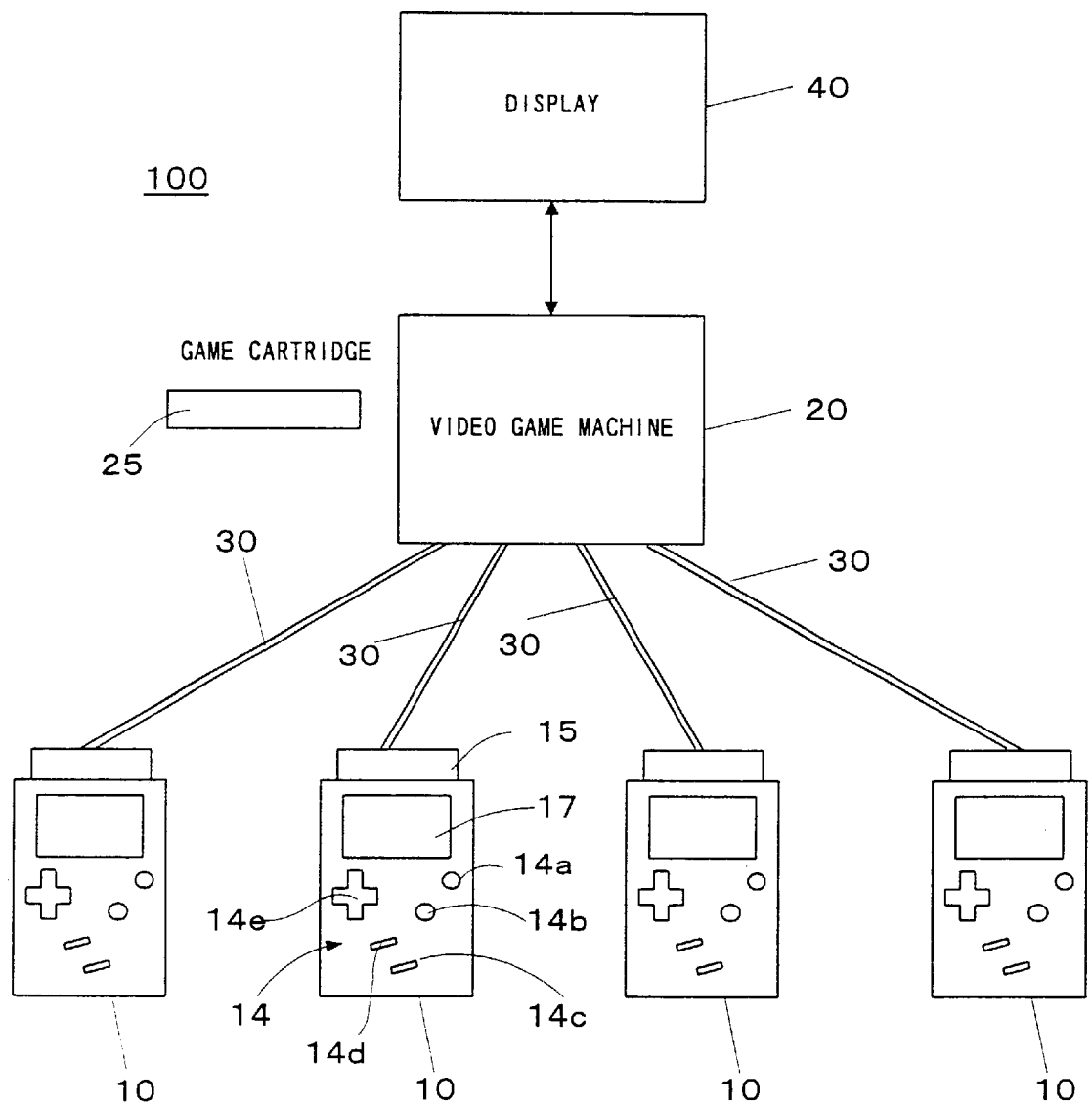
FIG. 1 is an illustrative view showing a combined game system according to an embodiment of the present invention.

FIG. 1 shows an example of a combined game system 100 to which the present invention is directed. The combined game system 100 of FIG. 1 includes a plurality (for in the embodiment) of portable game machines, 10, . . . , 10 connected to a video game machine 20 through communication cables 30. The video game machine 20 is in turn connected with a display 40, such as a CRT, liquid crystal display or plasma display. Each player on the portable game machine 10 is allowed to play one interactive game through use of his or her own game machine 10 together with the video game machine 20 and display 40.

Herein, the portable game machine 10 is "GameBoy" (product name) manufactured and marketed by the present applicant. The video game machine 20 is a recent video game machine adopting a 32-bit or 64-bit high technology with higher processibility (e.g. in CPU bits, CPU program processibility per unit time, image representation, etc) as compared to the portable game machines 10 (e.g. "Nintendo N64" (product name) manufactured and marketed by the present applicant).

The portable game machine 10 includes as a display an LCD (Liquid Crystal Display) 17 and has, at the underneath the LCD 17, a button A 14a, a button B 14b, a start key 14c, a select key 14d and a direction instruction key (cross key) 14e thus forming an operating device 14. The portable game machine 10 also has cartridge insertion hole (not shown) formed, for example, in its top end face to receive a game cartridge 15 in the cartridge insertion hole. Furthermore, a communication cable 30 is connected at one end to the game cartridge 15 and at the other end of the communication cable 30 to the video game machine 20.

By loading a game cartridge 25 onto the video game machine 20 and game cartridges 15 to the respective portable game machines 10, an interactive game can be played wherein a virtual world video image (a common game picture between the portable game machines 10: common picture) is displayed on the display 40 while different parts of the virtual world are on the respective LCDs 17 of the portable game machines 10 (game pictures unique to the respective portable game machines 10: discrete pictures).

In this case, each player on the portable game machine 10 utilizes his or her own game machine's operating device 14 to proceed the game. That is, the player on each portable game machine 10 operates the operating device 14 in a manner reacting to an object in the discrete picture being displayed on his or her LCD 17. The key input information to the operating device 14 is supplied to the video game machine 20. The video game machine 20 makes processing a unit (hereinafter stated) according to key input information to thereby send display information for a discrete picture to each portable game machine 10. Consequently, the display 40 displays a common picture to be varied by operating the operating device 14 of the portable game machine 10 while the LCD 17 of each portable game machine 10 displays a discrete picture to be varied according to operation on the own operating device 14.

Figure 2:
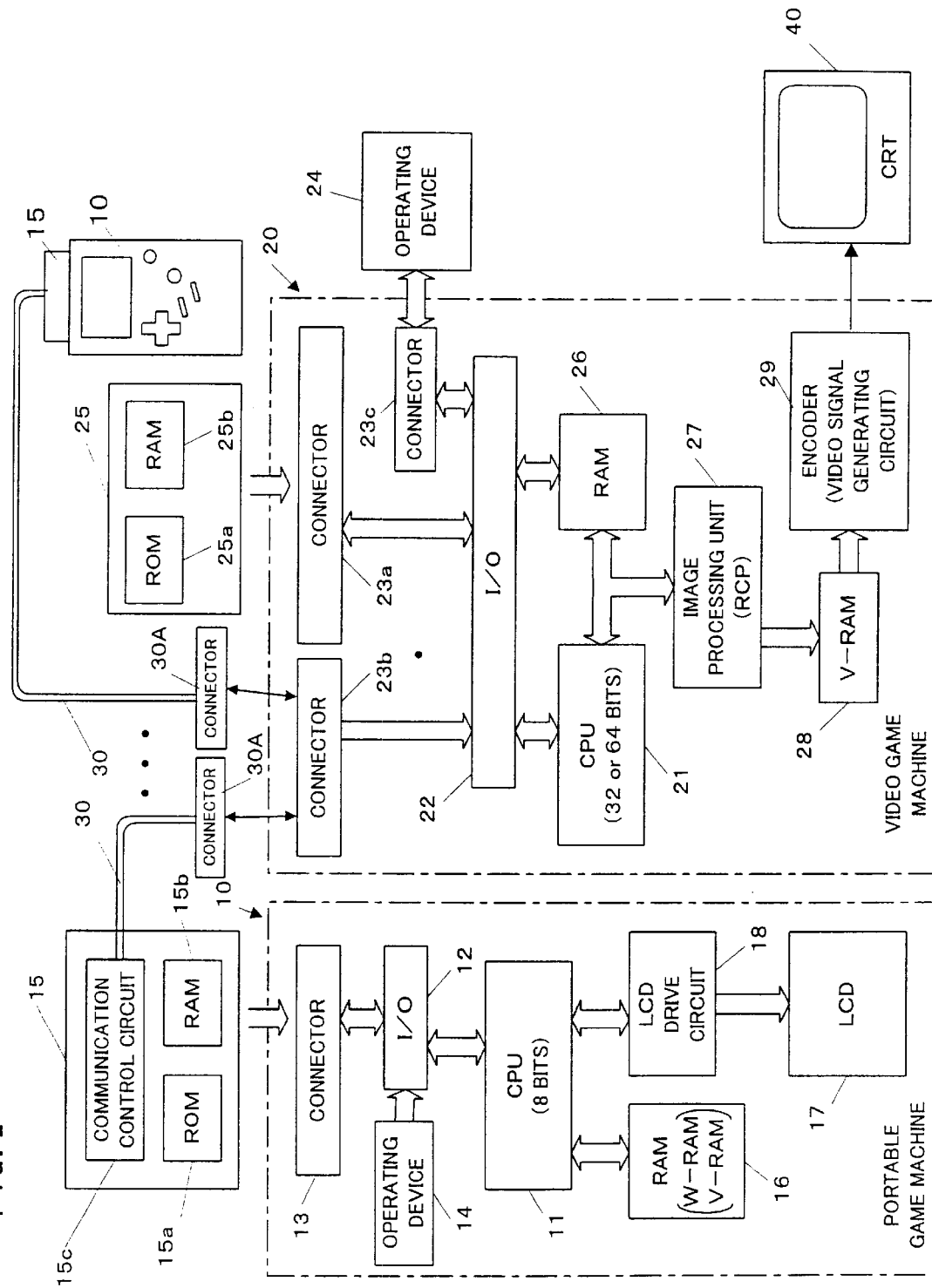
FIG. 2 is a block diagram of the FIG. 1 embodiment.

Referring to FIG. 2, the portable game machine 10 is provided with a connector 13. To the connector 13 is detachably attached a game cartridge 15 as an example of first game program storing means or second storage medium. As shown in FIG. 2, the portable game machine 10 also includes a CPU (first processor) 11, for example, of 8 bits. The CPU 11 is connected with an input/output interface (hereinafter referred to as "I/O") 12. To the I/O 12 are connected a connector 13 and operating devices 14, stated before, for instructing game character movement or its motion. Furthermore, the CPU 11 is connected with a RAM 16, such as a working RAM and display RAM, as second data storage means and with an LCD drive circuit for controlling the drive to the LCD 17.

The game cartridge 15 is unloadably loaded onto the portable game machine 10 through the connector 13 as described before, and includes a ROM 15a, a RAM 15b and a communication control circuit 15c. Note that "ROM" means a concept referring to a non-volatile memory including an EP-ROM, a one-time ROM, etc. Meanwhile, "RAM" signifies a concept including all rewritable memories. Consequently, RAM includes an EP-ROM or the like. The game cartridge 15 has such ROM 15a and RAM 15b mounted together with the communication control circuit 15c on a circuit board (not shown). This circuit board has a plurality of connection terminals formed on one side thereof. By electrically connecting the connection terminals to the connector 13, the game cartridge 15 is put into connection to the portable game machine 10, i.e. to the CPU 11.

The ROM 15a includes a game program storage area 151 and a game title storage area 152, as shown in a memory map of FIG. 3(A), for example.

The game program storage area 151 includes a key input information receive program to receive from an operating device 14 key input information representative of an operation state of the keys 14a–14e on the operating device 14, a key input information send program to transmit key input information to the video game machine 20, and a unit display program to display a unit in a game. The term "unit" herein refers to those to be processed by the portable game machine 10 and video game machine 20, including characters to appear in a game (including a player object, an enemy object, a background object, etc.), items, traps, players, etc. to appear in a game. The unit display program accordingly includes display position coordinates (X, Y, Z) of those to be processed as well as information minimally required for displaying the units (e.g. character codes, item codes acquired by a player, etc). Note that the portable game machine 10 is a two-dimensionally displaying game machine and hence requires only X and Y coordinates as positional coordinates. In the present embodiment, however, the video game machine 20 is a three-dimensional displaying game machine, and accordingly a Z coordinate is calculated in the portable game machine 10 in order to display a unit on the display 40 through the video game machine 20.

The game title storage area 152 previously stores data, such as game titles (or game titles with their versions if a game title has a plurality of versions).

The RAM 15b is supplied with power from a battery or the like in order to save storage data therein even after turning off power supply from the portable game machine 10, thereby preventing against data breakdown. The RAM 15b is provided with a unit information storage area 153.

The area 153 sets up, among the all to be processed, related units 1–N to the relevant portable game machine 10 to store unit 1–N coordinates (X, Y, Z) and information for display. The RAM 15b includes an identification code area 154 to store identification codes previously set for each game cartridge 15, a player name area 155 to store a player name inputted according to operation of the operating device 14 by a user, and a backup data area 156 to store data (pickup data) such as acquired-actor data and ability data on an acquired-character basis that is to be varied depending upon game progression and representative of situation on game progression.

The backup data to be stored on the RAM 15b may be varied depending upon a genre or kind of game software. For example, in the case that the game software is such a game as capturing an animal, imitation pet, imaginary animal (monster) or the like, raising a captured animal or the like or battling an animal captured by a player and that by his or her friend, the backup data would be captured-character data specifying a captured character, captured-character ability data, or data representative of tricks usable in battling. Also, where the game is a role playing game, the backup data would be data on kinds and the number of acquired items, magic to be used, experience values, life, etc. Furthermore, where the game in kind is a baseball game as an example of a sports game, the backup data be a past batting average, homerun count, stolen base count, error average, earned run average, strikeout count for each team athlete, and batting power, running power and pitched-ball speed depending upon training conditions, etc. For a card game, the backup data includes data of card hands of players on each portable game machine 10 or the like.

Incidentally, the communication control circuit 15c is coupled to bus lines of the ROM 15a and RAM 15b. If providing the bus lines to commonly access the ROM 15a and RAM 15b commonly by the CPU 11 of the portable game machine 10 and CPU 21 (hereinafter stated) of video game machine, the ROM 15a and RAM 15b can be accessed by the video game machine 20 through the communication control circuit 15c and by the portable game machine 10 via the connector 13. Incidentally, the communication control circuit 15c may be built within the main body of the portable game machine 10.

The identification code is an arbitrary code inputted through operating the operating device 14 by a player to discriminate a possessor of the game cartridge 15 or otherwise a serial number of the portable game machine 10. For example, the ROM 15a may be configured by a one-time ROM so that a serial number of the game cartridge 15 be fixedly written on the one-time ROM during a manufacture stage.

Incidentally, the portable game machine 10 is not limited to those that the game cartridge 15 is freely loaded and unloaded but may incorporate a ROM 15a and RAM 15b therein to integrally provide on the housing a connector to transfer backup data stored in the RAM 15b directly or through a cord.

Also, a large capacity (S-RAM) in place of the ROM 15a may be provided prevented against dissipation of data due to the battery wherein the S-RAM in part can be used as a corresponding program area to the ROM 15a with the remaining area used as a corresponding backup data area (temporary storage area) to the RAM 15b. In such a case, the game program or the portable game machine is previously stored in a ROM 25a, hereinafter referred. When starting a first game (game on only the portable game machine or combined game with the video game machine), check is made on whether or not the connector 30a of the portable game machine 10 is connected to the connector 23b of the video game machine 20. In response to a presence of transfer request of a program from the portable game machine 10 in a state that the connectors 30a and 23b are connected, a program for the portable game machine stored on the ROM 25a is transferred to the portable game machine 10 and stored in the program area of the RAM (corresponding to RAM 15a) in the cartridge 15.

Furthermore, in place of the cartridge 15 (external storage medium) including the ROM 15a and RAM 15b, a large capacity RAM (may be used also as a built-in RAM16) may be provided in the portable game machine 10. The RAM is used for both a program area and a backup data area. The program area may be updated and rewritten with program data for desired program.

Explanations will now be made concretely on the video game machine 20 constituting for the combined game system 100 as well as on the game cartridge 25 as an example of second game program storing means or first information storage medium. As shown in FIG. 2, the video game machine 20 includes, for example, a 64-bit CPU (second processor) 21. The CPU 21 is connected with an input/output interface (hereinafter referred to as "I/O") 22. The I/O 22 is connected with a connector 23a to connect a game cartridge 25 for the video game machine and a connector 23b to connect an operating device 24. Incidentally, the cartridge 25 is to be disconnectably connected to the connector 23a.

The game cartridge 25 incorporates a non-volatile memory (e.g. ROM, EP-ROM, etc.; referred to as "ROM") to store a game program for the video game machine 20, and a writable and readable memory (e.g. RAM, EP-ROM, etc.; referred to as "RAM") 25b as an example of data storage means to store unit-related information, which are mounted on a substrate (not shown). The substrate has a plurality of terminals formed in one side, the terminals of which are electrically connectable to the connector 23a.

Figure 4:
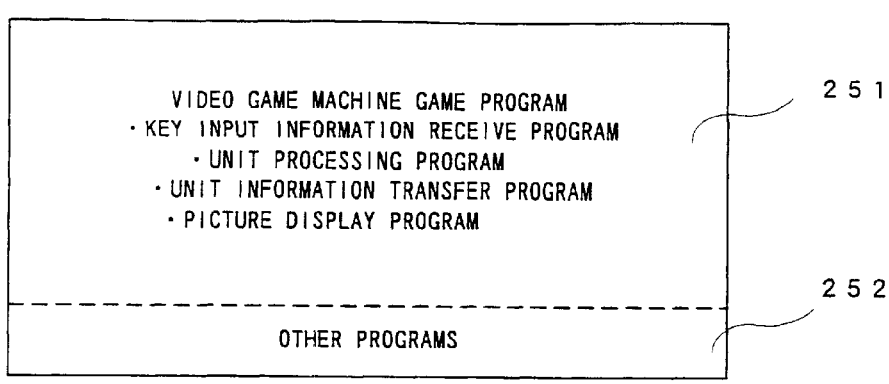
FIG. 4 is an illustrative view showing an external ROM memory map for a video game machine in FIG. 2.

The ROM 25a, which is a ROM greater in capacity than the ROM 15a, includes a video game machine program area 251 to store a game program for the video game machine, as shown in a memory map of FIG. 4. This program area 251 previously stores a key input information receive program to receive key input information of the operating device 14 for the portable game machine 10, a unit processing program to process the "unit" mentioned before, a unit information transfer program to transfer the information of a unit processed by the video game machine 20 to the portable game machine 10, a display program to three-dimensionally display a common picture on the display 40 according to the information of the unit processed by the video game machine 20, and so on. Incidentally, on the ROM 25a an area 252 is formed as required to store other programs.

The RAM 25b has a storage capacity several times greater as compared to the storage capacity of the RAM 15b, and is capable of storing information about all the units on all the portable game machine 10 in connection to the video game machine 20.

Incidentally, in place of such a game cartridge 25, other information storage mediums, e.g. game program storing means such as a EP-ROM or magnetic disk, may be utilized.

The video game machine 20 further has another connector 23b. To the connector 23b are connected the connectors 30A, ..., 30A of the communication cables 30, ..., 30 mentioned before. Consequently, the game cartridges 15 on the portable game machines 10 are connected to the CPU 21 via the connector 30a of communication cable 30 and the connector 23b. Incidentally, in FIG. 2 explanation was made that the connectors 30a in plurality were connected to the one connector 23b. Alternatively, one connector 23b may be arranged so as to connect only one connector 30a wherein such connectors 33b may be provided in the equal number to the number of connectable portable game machine 10 to the video game machine 20.

Furthermore, the CPU 21 is connected with a RAM 26 as temporary storage means or first data storage means usable as a working RAM or the like, and with an image processing unit (RCP) 27.

Figure 5:
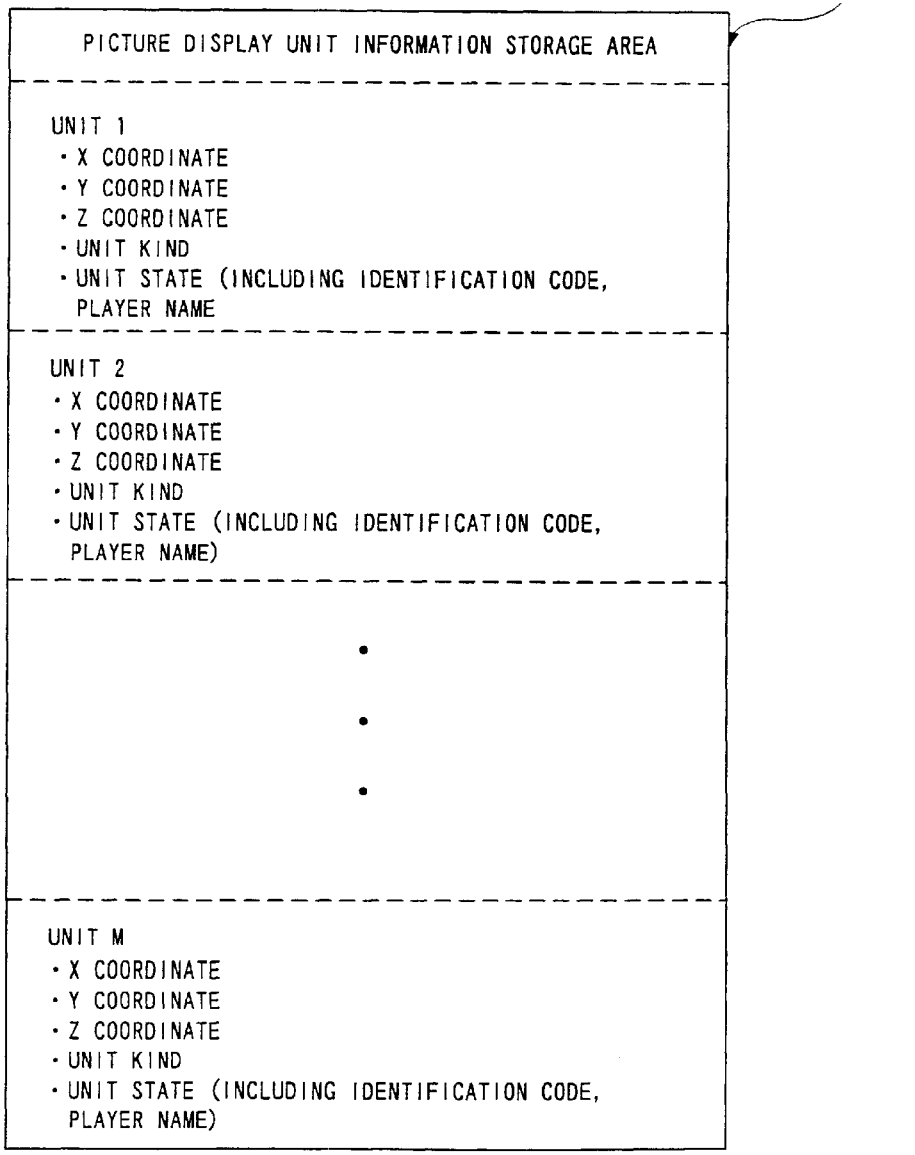
FIG. 5 is an illustrative view showing part of a RAM memory map of the video game machine in FIG. 2.

The RAM 26 includes, as shown in a memory map of FIG. 5, a unit information storage area 260 to store related information to the units on all the portable game machine 10 being connected to the video game machine 20 in order to display a common picture on the display 40. On the unit information storage area 260 are stored display coordinate positions (X, Y, Z), kinds and states of all the units 1–M. The kind of a unit represents what the unit represents, including e.g. a player, a player object, an enemy object, and item, etc. Also, the state of a unit is configured by various data corresponding to each unit number, such as player object HP (Hit Points), MP, player object level, etc.

Figure 6:
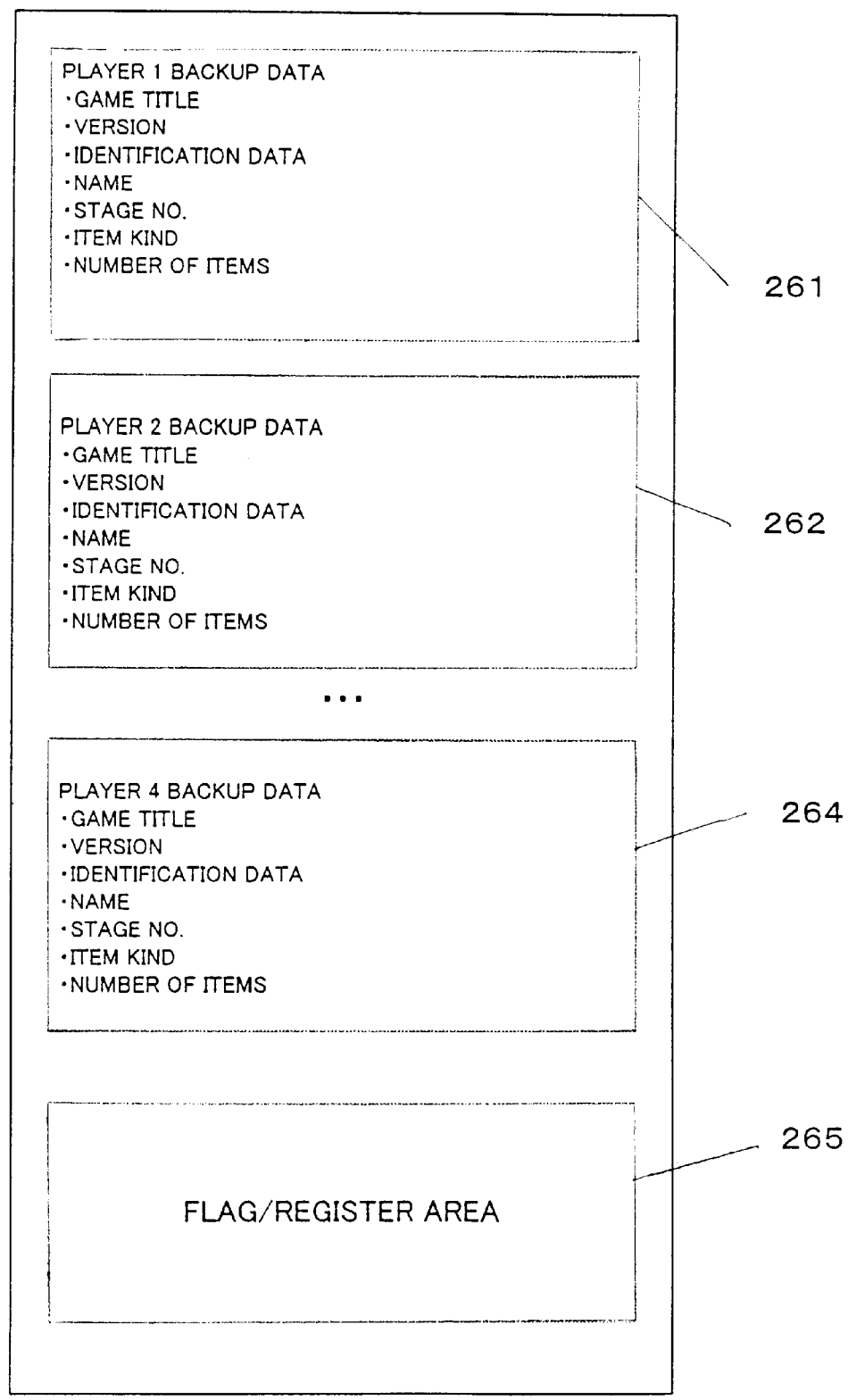
FIG. 6 is an illustrative view showing part of the memory map of the RAM of the video game machine in FIG. 2.

In the meanwhile, the RAM 26 further includes storage areas 261–264 assigned for respective portable game machines 10, as shown in FIG. 6. These storage areas 261–264 store information such as game titles corresponding to portable game machines 10, ..., 10 in the number connectable to the video game machine 10, and other unit information. That is, the areas 261–264 store a game title, a version number, an identification code, a player name and other unit information. Here, other information is data for each portable game machine required to provide common display upon performing an interactive game with the video game machine 20. For example, for a role playing game shown in FIG. 7 to FIG. 12 hereinafter described, the-above other unit information is on stage numbers representative of game progression, the kinds and the numbers of items, etc. Incidentally, where the game in kind is a card game hereinafter stated, the above other unit information is on the kinds and the numbers of card hands possessed by respective players of the portable game machines, the kinds of cards discarded immediately before, etc. For a race horse raising games, the above other unit information is on data representative of an attribute (feature) of a horse chosen from raised race horses in order to run a horse race, etc.

Incidentally, instead of using the RAM 26 as temporary storage means in this manner, a buffer memory may be appropriately provided between the code 23b and the I/O 22 so that the buffer memory is used as temporary storage means.

An RCP (Image Processing Unit) 27 is connected with a video RAM 28. The video RAM 28 has a storage area to store color data in read (R), green (G) and blue (B) corresponding to dots on one screen of a raster scan display 40. Under control of the RCP 27, color data writing and/or reading is made for color display. The color data read out of the video RAM 28 is converted into an analog R signal, G signal and B signal and/or a composite video signal by an encoder and/or a composite video signal generating circuit 29, and supplied onto a CRT.

Explanation is now made on the operation of the portable game machine 10 and video game machine 20 of the combined game system 100 of this embodiment. First, a player loads the game cartridge 15 on his or her portable game machine 10 and then turns a power switch (not shown) on. Then, the CPU 11 of the portable game machine 10 in the first step S1 of FIG. 7 executes an initial setting. In the succeeding step S2, the CPU 11 causes the LCD 17 to display a start-up picture or initial picture according to the loaded game cartridge 15. This initial picture includes game titles and title back video images.

Figure 7:
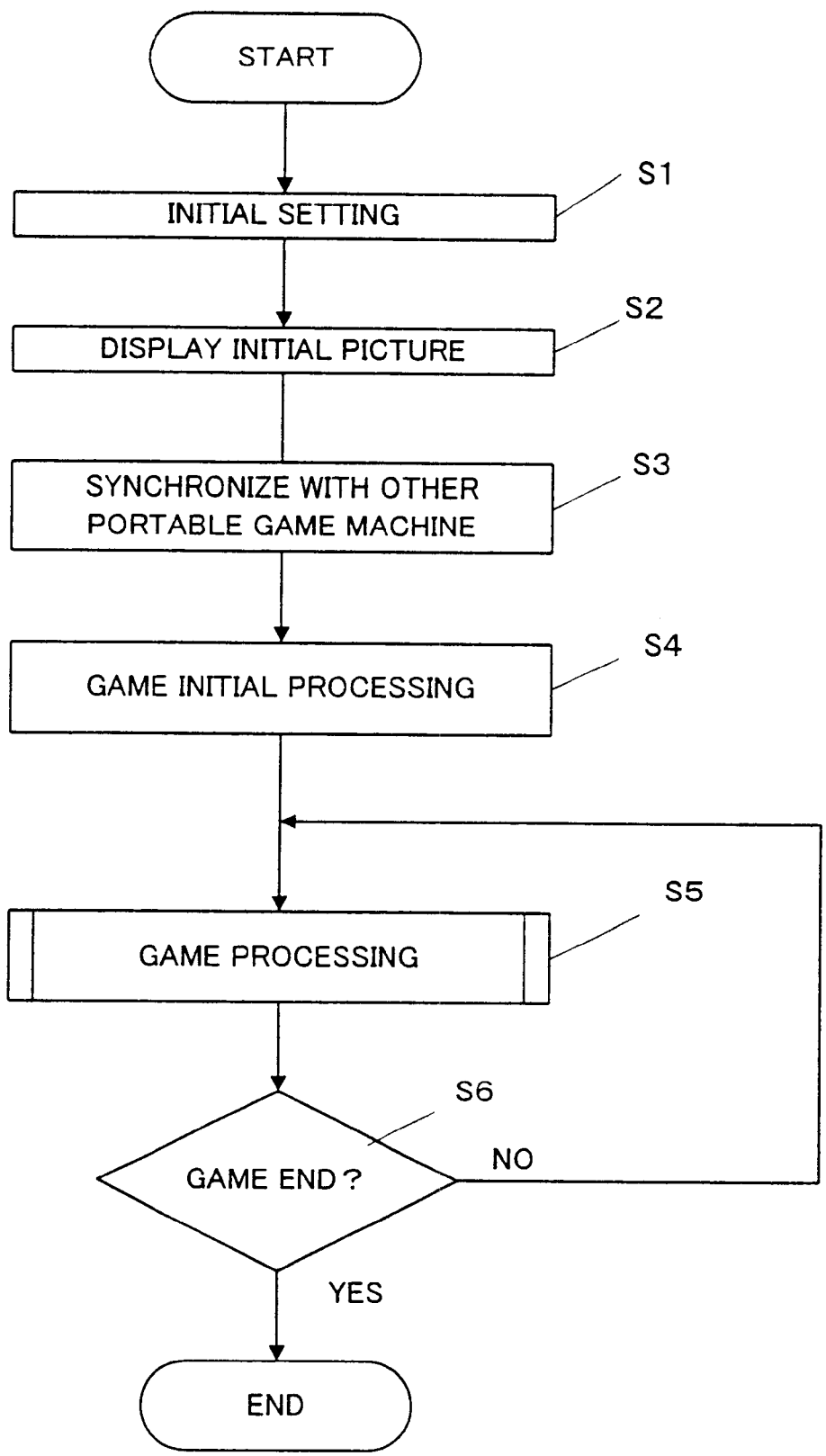
FIG. 7 is a flowchart showing an operation main routine for a portable game machine in the FIG. 2 embodiment.

Then, the CPU 11 in step S3 of FIG. 7 establishes synchronism with other portable game machines. Specifically, synchronism is established with other portable game machines by receiving identification information sent at a start of a game from the video game machine 20. In the succeeding game initializing process of step S4, the CPU 11 turns on the LCD 17 and sets the kinds of random numbers of the registers to a same kind for all the portable game machines.

Thereafter in step S5, the operating device 14 is operated to play a game for the portable game machine. Thereupon, the CPU 11 transfers an operating state, or key input information, of the operating device 14 to the video game machine 20 and receives varied discrete picture display data from the video game machine 20. The CPU 11 supplies the same display data to an LCD drive circuit 18, making discrete picture display on the LCD 17.

Incidentally, in such a game operating state, each time a condition of generating or updating backup data depending upon game progression is reached, the CPU 11 updates backup data and temporarily stores it in the RAM 16 and, in appropriate timing, transfers it to the RAM 15b for storage.

Figure 8:
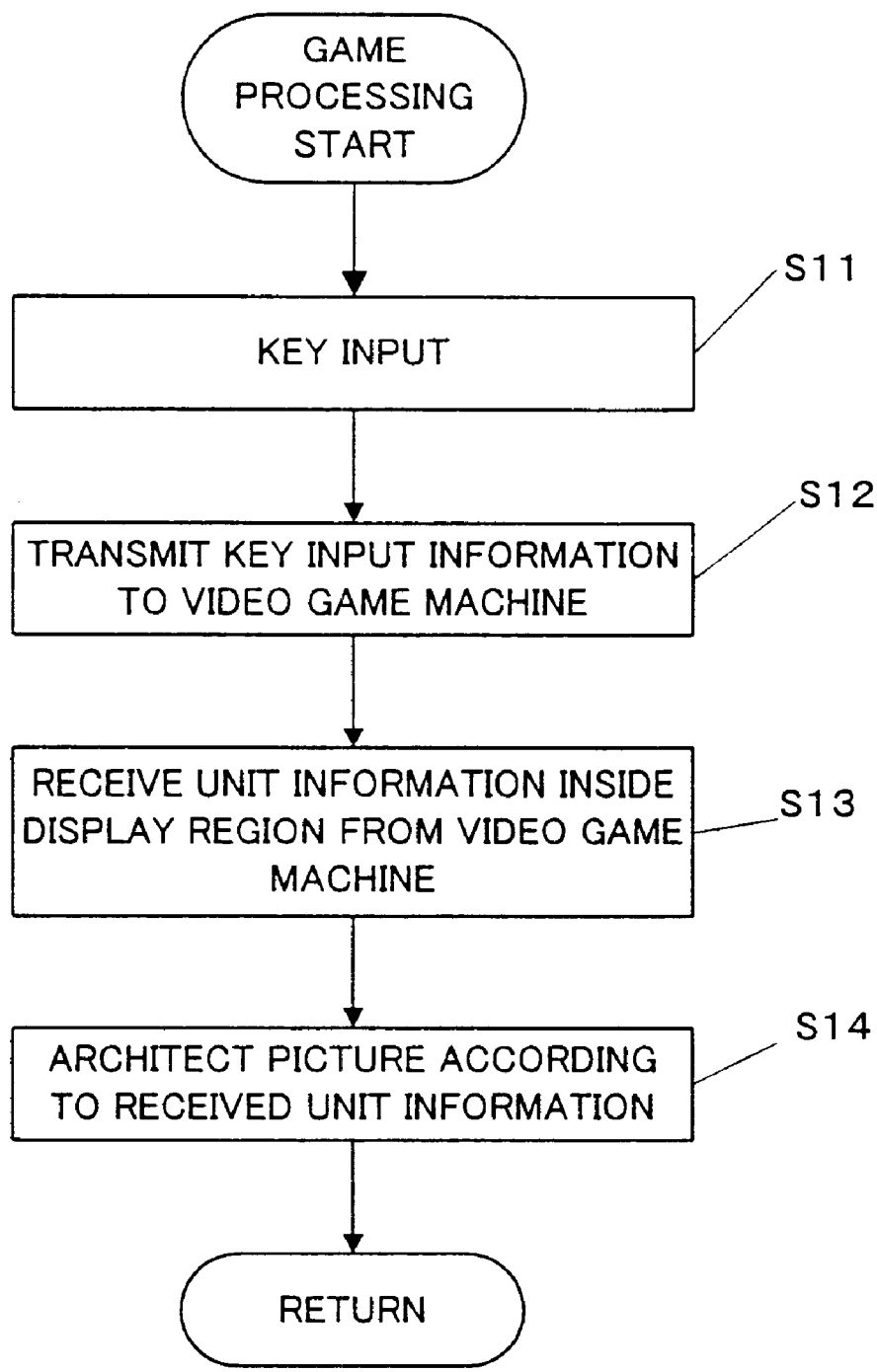
FIG. 8 is a flowchart showing a game processing subroutine in FIG. 7.

Explaining concretely with reference to FIG. 8, when starting a game processing, the CPU 11 in step S11 fetches a key input from the operating device according to a key input information receive program shown in FIG. 3(A), and sets it onto a proper key input register (not shown). In the succeeding step S12, the CPU 11 transfers an operating state of the keys 14a–14e stored in the same key input register, i.e. key input information, to the video game machine 20 according to a key input information send program in the same area 151 (FIG. 3(A)). In step S13, CPU 11 receives a display range of the relevant portable game machine 10 and the unit information included in that display region from the video game machine 20. The CPU 11 in step S14 architects a discrete picture to be displayed on the LCD 17 according to the received unit information.

Accordingly, on the portable game machine during executing a game processing, a discrete picture would be displayed on the LCD 17 that is to be varied according to key operations of its the relevant operating device 14.

Figure 9:
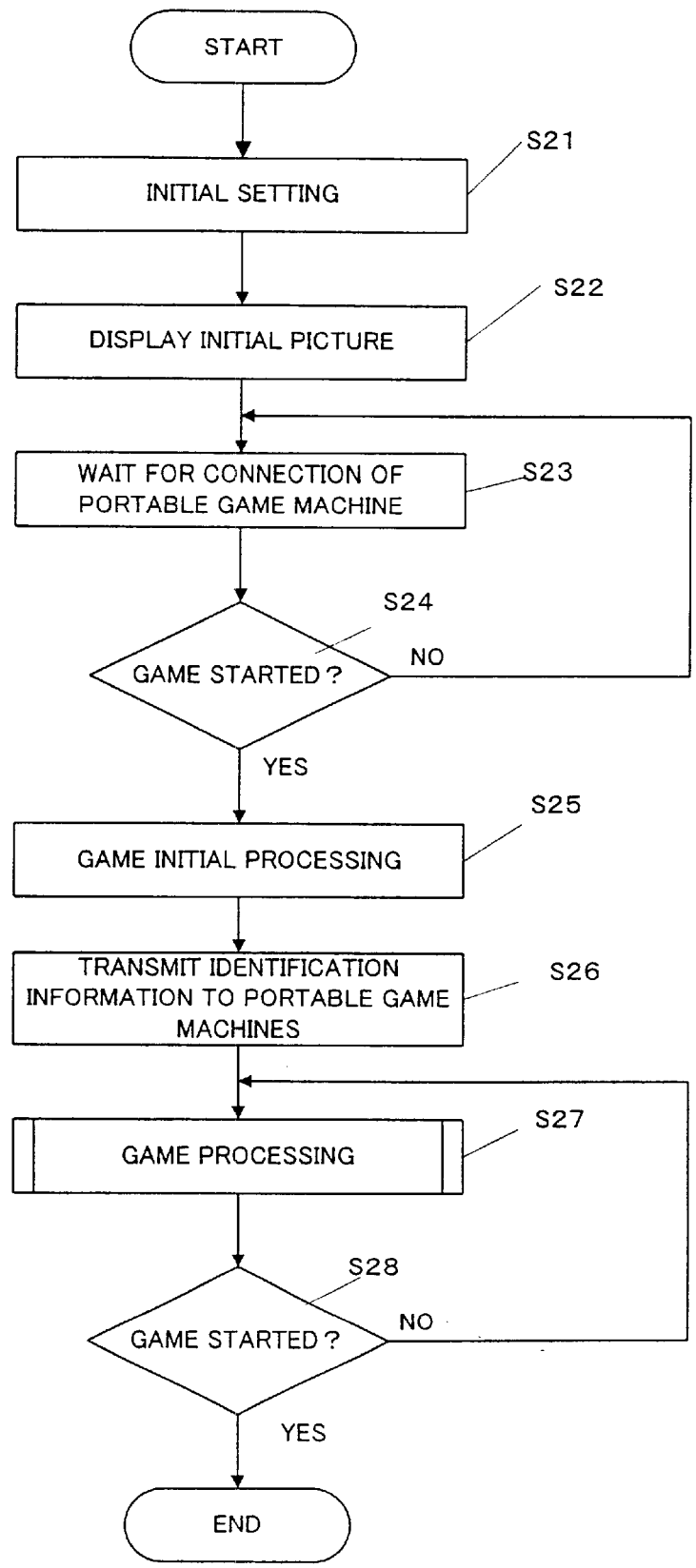
FIG. 9 is a flowchart showing an operation main routine for the video game machine in the FIG. 2 embodiment.

Explanation is made on the operation of CPU 21 on the video game machine 20, with reference to FIG. 9. First, the player attaches a game cartridge 25 onto the video game machine 20 and then turns on a power switch (not shown). Then, the CPU 21 of the video game machine 20, in the first step S21 of FIG. 9, executes an initial setting. In the succeeding step S22, the CPU 21 causes the display 40 to display a start-up picture or initial picture according to the loaded game cartridge 25. This initial picture includes a game title and a title back video image.

In steps S23 and S24, the CPU 21 waits for key input information to be sent from the portable game machine 10. That is, if receiving such key input information in step S23, then the CPU 21 in step S24 determines "YES" and advances to a next step S25.

In step S25 a game initial process is executed. Specifically, in this step S25, initial values unique to the relevant game are set onto the register/flag area 165 included in the CPU 21 or RAM 26 (FIG. 2) of the video game machine 20.

In the next step S26, the CPU 21 transmits the aforesaid identification information to the portable game machines 10. The "identification information" is data for the CPU 21 to identify each of the portable game machines 10. For example, where two portable game machines 10 are connected to the connector 23c of the video game machine 20, identification information "01h" is transmitted to a portable game machine being connected to the first connector and "02h" to a portable game machine being connected to the second connector. Consequently, the CPU 11 of each portable game machine recognizes its own transmission data due to such identification information. According to the recognized transmission data, the step S13 stated before is executed.

In steps S27 and S28, the CPU 21 continues to execute the game processing until a game end is detected.

Figure 10:
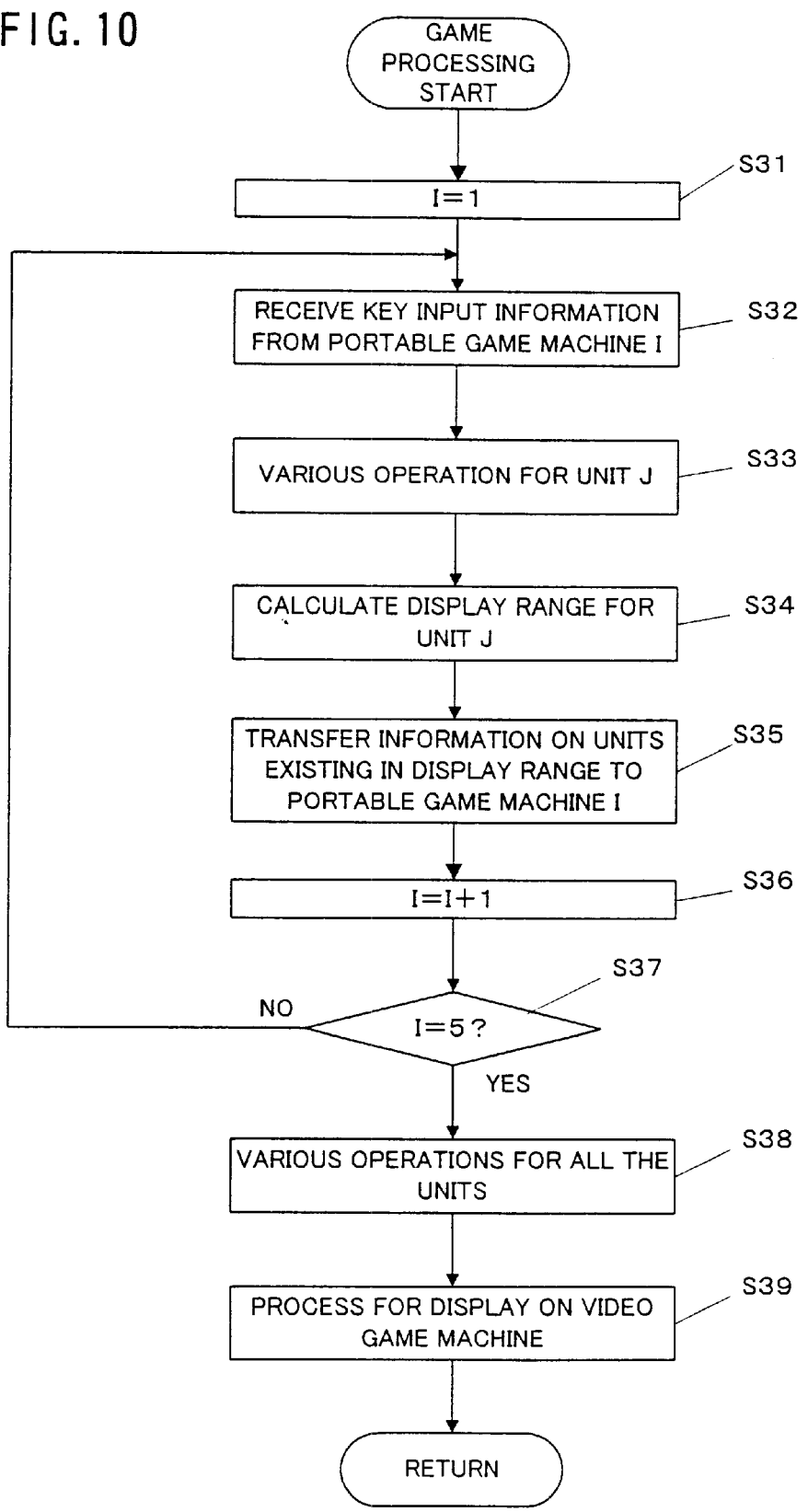
FIG. 10 is a flowchart showing a game processing subroutine in FIG. 9.

FIG. 10 concretely shows a game processing step S27. In the first step S31 of FIG. 10, the CPU 21 sets the number I of the portable game machines 10 being connected to the video game machine 20 as "I=1". The CPU 21 in the next step S32 receives key input information from a first portable game machine according to a key input information receive program shown in FIG. 4.

Based on this key input information, the CPU 21 in step S33 performs various operation processings according to a unit processing program of FIG. 4, thereby processing a unit J (J is an arbitrary natural number). Specifically, calculations are made for a movement, action, change and the like for the unit J. In the next step S34, a display range including the unit J processed in step S33 is calculated based on coordinate (X, Y, Z) information of the unit J (FIG. 5). In step S35 the CPU 21 transfers required information for displaying all the units included in this display range, together with the information on the unit J processed before, to an Ith (first, if I=1) portable game machine 10, according to a unit information transfer program of FIG. 4.

Subsequently, in step S36 the no. I of the portable game machine 10 is incremented (I=I+1). It is determined in step S37 whether the n0. I becomes "5" or not. That is, because in this embodiment the one video game machine 20 can connect four portable game machines 10, it is determined in this step S37 whether the processing on a fourth portable game machine has ended or not. Accordingly, as long as "NO" is determined in this step S37, the CPU 21 returns to the step S32 to thereby execute processing for a different portable game machine.

If "YES" is determined in step S37, it is considered that all of the processing on the portable game machines 10 in connection to the video game machine 20 at that time have ended. Accordingly, in the next step S38 operation processing is executed on all the units 1–M shown in FIG. 5 in order to display a common picture on the display 40.

Then, in step S39 a common screen is architect including all the units 1–M and displayed on the display 40.

Figure 3:
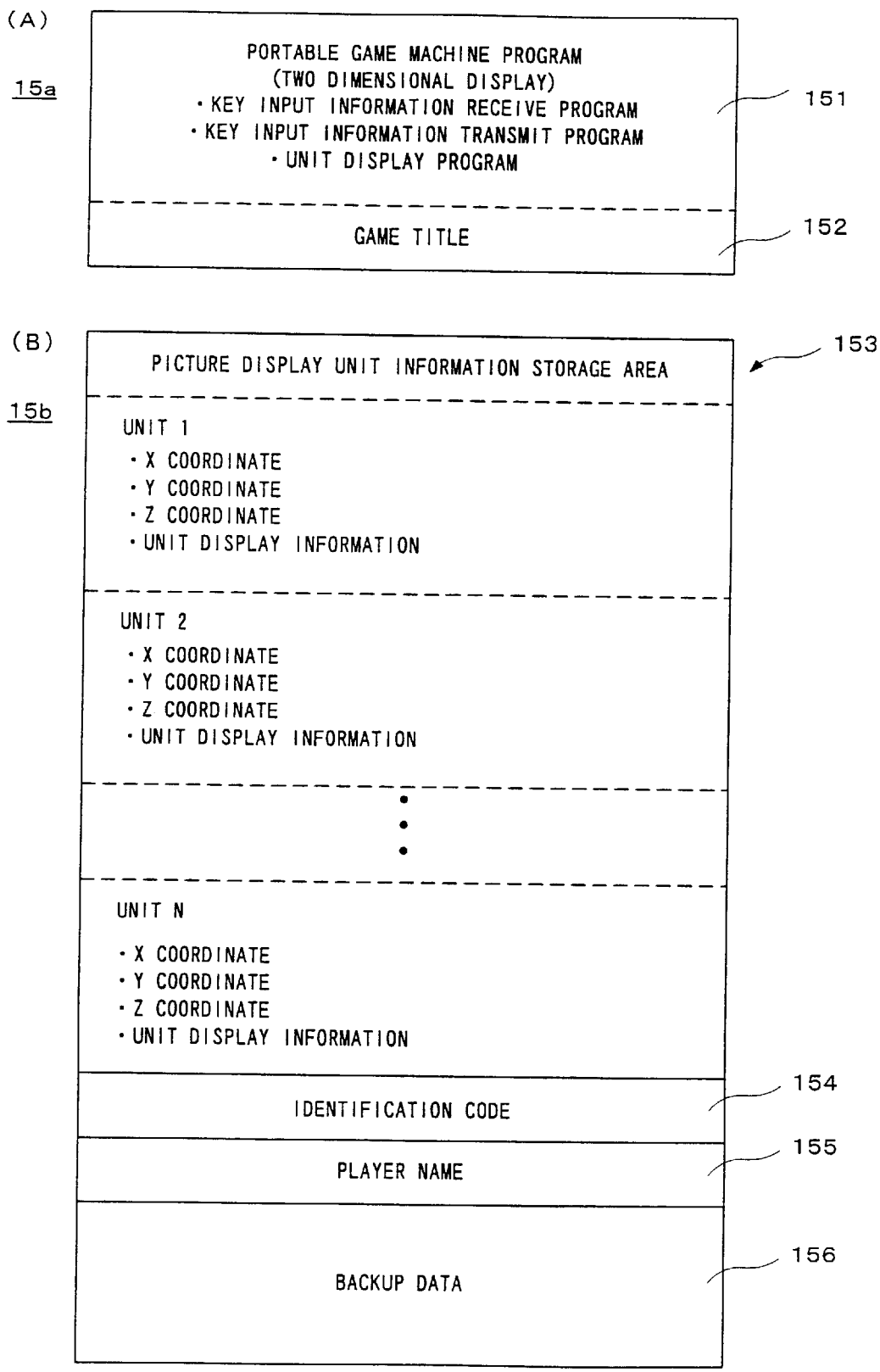
FIG. 3 is an illustrative view showing a memory map of a portable game machine in FIG. 2.

Incidentally, in the above embodiment where the identification code set in the region 154 of FIG. 3 is sent from the portable game machine to the video game machine 20, it is satisfactory to transmit an identification code together with key input information in step S12 of FIG. 8. In this case, the video game machine 20 in step S32 (FIG. 10) receives the identification code. On the other hand, because the identification code of each portable game machine 10 is stored as unit information in the area 253, it is possible in the video game machine 20 to verify an agreement or disagreement of the identification code of each portable game machine in step S33 wherein no unit information is sent in the case of a disagreement. For example, where the game cartridge 15 on the portable game machine 10 is changed during operation, disagreement of the identification code occurs resulting in no transmission of unit information to the portable game machine. If no unit information is transmitted from the video game machine 20, the portable game machine 10 cannot update its discrete picture thus resulting with a result that an interactive game be impossible to play. That is, the identification code can prevent the game cartridge for the portable game machine from being changed carelessly or illegally.

Figure 11:
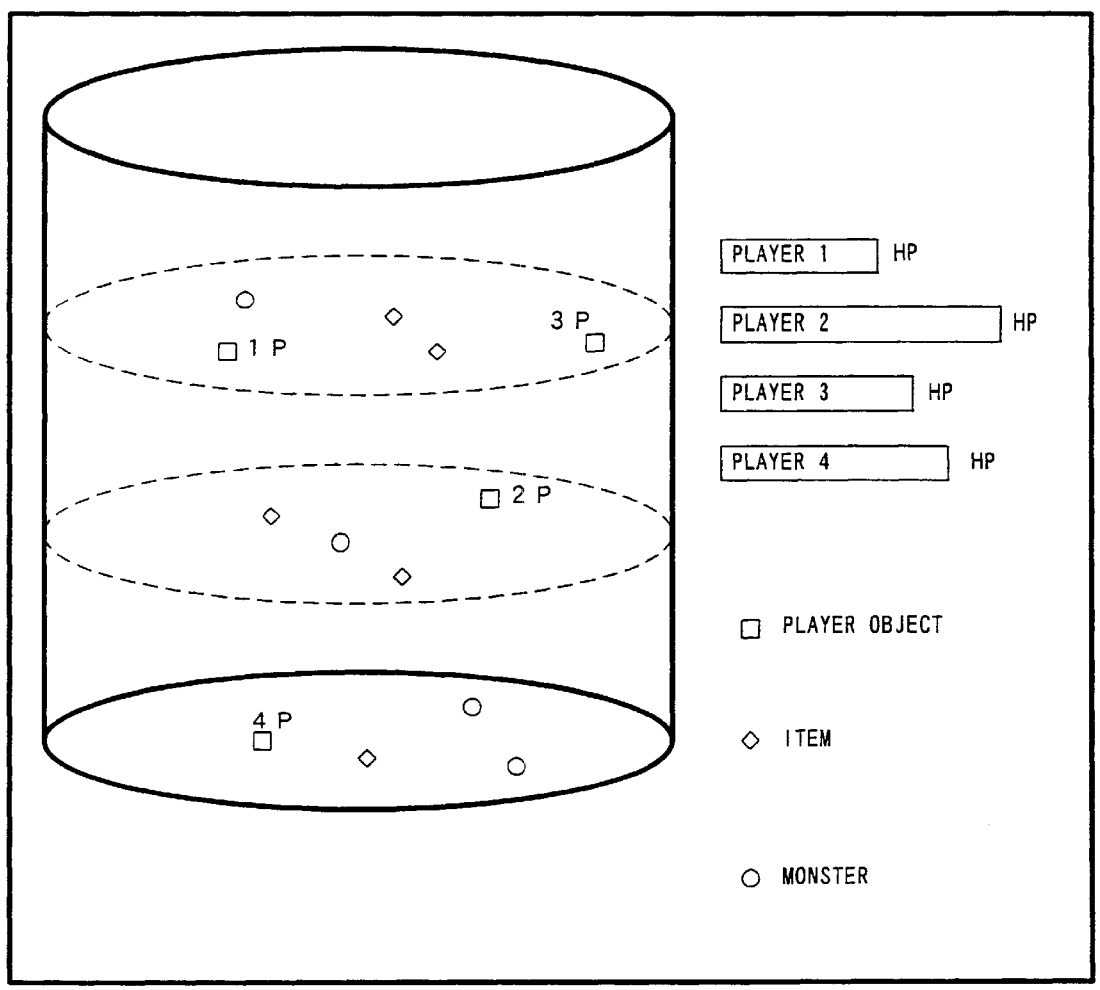
FIG. 11 is an illustrative view showing an example of a display picture on the video game machine in the FIG. 2 embodiment.

Referring to FIG. 11 and FIG. 12, explained is an example of a role playing game to be played on the combined game system 100 of the above embodiment.

In this embodiment, FIG. 11 shows a common picture or virtual world to be displayed on the display 40. FIG. 12 shows discrete pictures to be displayed on the respective LCDs 17 on the portable game machines 10. Note that in FIG. 11 and FIG. 12 a square denotes a player object, a diamond an item and a circle a monster. In this game, the unit information storage areas 153 and 253 include information in what floor each unit exists in a tower of FIG. 11 with respect to the Z coordinate.

In the common picture shown in FIG. 11, one tower is displayed having a plurality of floors. It is assumed that a player object 4P of a fourth player exists on a lowermost or first floor, a player object 2P of a second player on a second floor, and respective player object 1P and 3P of a first player and third player on an uppermost or third floor. FIG. 12(A) shows a display range including the player object 1P for the first player, i.e. a discrete picture for the first player. FIG. 12(B) shows a display range including the player object 2P for the second player, i.e. a discrete picture for the second player. FIG. 12(C) shows a discrete picture including the player object 3P for the third player, and FIG. 12(D) a display range including the player object 4P for the fourth player, i.e. a discrete picture for the fourth player.

In the game of this embodiment, by capturing a monster hiding inside the tower or by acquiring a concealed item, each player is allowed to use various traps or monsters. As stated above, these monsters, traps, players, items, etc. are all controlled as units and held on the RAM 25b of the video game machine 20. If key input information is transmitted from a portable game machine 10 onto the video game machine 20 (step S12), the CPU 21 of the video game machine receives the key input information on each portable game machine 10 (step S32) and executes operation processing for all the units to move, attack, depend, change and the like (step S33). Then, the CPU 21 of the video game machine 20 calculates respective display ranges on the portable game machines 10 according to coordinate information on the player objects 1P to 4P (step S34) and transmits only required information for displaying the units existing in the display range to a relevant portable game machine 10 (step S35).

Incidentally, where no communication control circuit is provided on the video game machine 20 side, the CPU 21 may write unit information to be transmitted to a corresponding portable game machine into a corresponding transmission/reception buffer memory or register to each portable game machine.

The CPU 11 of the portable game machine 10 receives only required information from the video game machine 20 (step S13) to architect a discrete picture (step S14). At this time, each player cannot see other player's discrete pictures, i.e. LCDs 17 of other portable game machines 10. Thus, the player can secure secrecy of information from other players.

It should be noted that the display 40 in connection to the video game machine 20 displays an overall picture as shown in FIG. 11. The overall or common picture is principally on information to be commonly known by each player, such as an overall map or order at present. At this time, a third player can know through the common picture of a state of two players, e.g. one have allured the other into a trap or so.

In this manner, a winner is a player who have achieved a contemplated game object, e.g. making other player HP "0" or defeating boss set on the tower uppermost floor. Note that it is possible to contemplate such a particular object that the players cooperate to defeat the boss.

In the combined game system of the embodiment shown in FIG. 1 and FIG. 2, it is possible to enjoy a role playing game of wherein a plurality of persons can participate as above. However, it is also possible to enjoy a competition game, such as a card game or horse race game.

For a card game including trump, flower cards or card collection, the game is proceeded in compliance with an established rule of a card game. In such a case, the CPU 11 of the portable game machine 10 performs selection of a card using the operating device 14 and data transfer to and from the video game machine 20, based on the program stored on the second storage medium or game cartridge 15. The CPU 21 of the video game machine 20 processes to display a common picture, and reads key input information on the operating devices of the portable game machines 10 and processes the unit in accord therewith, based on the game program stored on the first memory medium or game cartridge 25, thereby transmitting unit information to the portable game machines 10. Accordingly, the portable game machine LCD 17 displays as a discrete picture a card hand (a card not to be seen by other players) of the player. The video game machine display 40 on its screen 40 displays, as a common picture, a trump card put in a community area (or a winning card or discarded card, as the game rule may be), a heap of piled cards, rotation of players, nomination to the dealer, and so on. At an end of a game, name of a winner, score of each player, and the like may be displayed.

For realizing this, the RAM 16 of the portable game machine 10 has a storage area provided or allocated to memorize a card hand of a player. The RAM 26 of the video game machine 20 has a site allocated to memorize the cards possessed by the respective players on the portable game machines 10, corresponding to the portable game machines 10, . . . , 10. If a certain player opts to discard any card in hand, a code representative of kind of the card is transferred to the RAM 26 of the video game machine 20. That is, the area of the same portable game machine storing the discarded card is cleared off, and the code of the card is written to a corresponding area of the RAM 26 to the player. Similarly, where a certain player draws one card from a card heap, top kind data of a heap stored in the RAM 26 of video game machine 20 is transferred to the player's portable game machine 10, and written to the RAM 16 of the same portable game machine 10.

The portable game machine LCD 17 displays as a discrete picture a symbol of a piece in a hand of player (piece not to be seen by other players), together with a cursor or the like for choosing a piece to discard. The video game machine 40 on its screen displays, as a common picture, piled pieces, pieces discarded in the community field, rotation of players and so on. At the end of one play, name of a winner, each player's score and the like are displayed. Note that each player's piece selection is made on the operating device 14 of the portable game machine 10, similarly to the above card game.

For a horse race game, a race horse is raised and a horse race is played with such a raised horse. In such a case, the race horse is raided on the portable game machine 10. Each player chooses a horse thus raised on the portable game machine 10, and plays a horse race using a selected horse on the display 40 of the video game machine 20. In this case, the horse raised on the portable game machine may be determined in its running ability (running ahead throughout or last spurt, etc) depending upon a way of raising the horse. The superiority or inferiority of each race horse may be determined depending upon its favorite environment (e.g. what state of a racecourse is favorite of a heavy racecourse, a lawn racecourse, a dirt racecourse, etc., or which is favorite of a right-hand course or a left-hand course, or a presence or absence of a slope).

In any of the cases, as states of display, three-dimensional display is given for display on the display 40 of the video game machine 20, while two-dimensional display is for display on the LCD 17 of the portable game machine 10. However, three-dimensional or two-dimensional display may be made on both the display 40 and the LCD 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A combined game system for playing a multiplayer interactive game, the combined game system including a video game machine providing a common display and connected through at least one communications link with a plurality of portable game machines each having a discrete display, each said portable game machine comprising:
   an operating device for outputting an operation signal depending upon an operation for a game;
   a first game program storage for storing a portable game program for execution on said portable game machine;
   a first processor that generates first display data to be displayed on said portable game machine discrete display based on an output of said operating device and the portable game program, and processes information corresponding to units used in the multiplayer interactive game for interacting with said video game machine; and
   a data transceiver for transmitting said information corresponding to said units to and receiving said information corresponding to said units from said video game machine via said communications link;

said video game machine comprising:
   a second game program storage for storing an operation program for said video game machine and a program for an interactive game;
   a temporary storage for temporarily storing information corresponding to said units transmitted to said plural portable game machines through said communications link and said data transceiver and temporarily storing information corresponding to said units received from said portable game machine through said communications link and said data transceiver, and also for temporarily storing an output of said operating device; and
   a second processor that generates second display data to be displayed on said common display based on the program stored in said second game program storage, and generates display data for the multi-player interactive game to be displayed on said common display, in response to the information corresponding to said units stored in said temporary storage and received from said portable game machines and outputs of said operating devices of said portable game machines, wherein said first processor changes an image displayed on said discrete display in response to an operation of the operating device of a corresponding one of said plurality of portable game machines, and said second processor changes an image displayed on said common display in accordance with operations of said plurality of portable game machines, whereby said video game machine and said plurality of portable game machines interact at the substantially same time to execute the multiplayer interactive game, wherein said second processor performs arithmetic operations for all the information corresponding to said units to display on said common display a map having a wider range including units of all of the plurality of portable game machines and calculates display ranges of map portions to be displayed on respective portable game machines on the basis of coordinates information associated with the units respectively corresponding to player objects of the respective portable game machines, each said first processor receives from said video game machine the display range for a corresponding one of the plurality of portable game machines and the information of the units for display by the one portable game machine, and displays the map portion for the one portable game machine based on the received display range and the unit information, and said map is displayed on said common display and said map portions are respectively displayed on the respective discrete displays, and said display ranges of said map portions are changed in response to movements of the player objects for the respective portable game machines.

2. A combined game system according to claim 1, wherein said communications link includes a plurality of connecting structures for connecting said plurality of portable game machines to said video game machine, said temporary storage having a plurality of storage areas to store, correspondingly to said plurality of portable game machines, the unit information transmitted to or received from said plurality of portable game machines through said connecting structures, and said second processor generates display data for the interactive game based on the corresponding unit information stored in said temporary storage and provides the display data to a certain one of said plurality of portable game machines or stores a corresponding output of said operating signal generator of said certain one of said plurality of portable game machines.

3. A combined game system according to claim 1, wherein said first game program storage stores a program to be operated as a combined game of said plurality of portable game machines and said video game machine when said plurality of portable game machines are connected to said video game machine via said communication link, and alternatively, stores a program to be operated as a single portable game when said plurality of portable game machines are not connected to said video game machine via said communication link.

4. A combined game system according to claim 1, wherein a two-dimensional image is displayed on one of said discrete display and said common display, and a three-dimensional image is displayed on the other of said discrete display and said common display.

5. A combined game system according to claim 1, wherein said second processor determines whether or not said portable game machines are connected to said video game machine prior to the start of said game, and reads said portable game program from said portable game program storage area and writes said portable game program into said writable and readable memory in response to that said portable game machine is connected to said video game machine and a transfer request is outputted from said portable game machines.

6. A combined game system according to claim 1 wherein:
said first game program storage is a writable and readable memory, and
said second game program storage includes:
a portable game program storage area to store a program for said portable game, and
a storage area storing a transfer program to transfer and store said portable game program stored in said portable game program storage area to said writable and readable memory when at a start of said game said portable game machines are connected to said video game machine through said communications link, and
wherein said unit information includes kind information indicating a predetermined characteristic, and coordinates information indicating a display position of the unit.

7. A combined game system for playing a multiplayer interactive game, the combined game system including a video game machine providing a common display and connected through at least one communications link with a plurality of portable game machines each having a discrete display, each said portable game machine comprising:
an operating device for outputting an operation signal depending upon an operation for a game;
a first game program storage for storing a portable game program for execution on said portable game machine;
a first processor that generates first display data to be displayed on said portable game machine discrete display based on an output of said operating device and the portable game program, and processes information corresponding to units used in the multiplayer interactive game for interacting with said video game machine; and
a data transceiver for transmitting said unit information to and receiving said information corresponding to said units from said video game machine via said communications link;
said video game machine comprising:
a second game program storage for storing an operation program for said video game machine and a program for an interactive game;
a temporary storage for temporarily storing information corresponding to said units transmitted to said plural portable game machines through said communications link and said data transceiver and temporarily storing information corresponding to said units received from said portable game machine through said communications link and said data transceiver, and also for temporarily storing an output of said operating device; and
a second processor that generates second display data to be displayed on said common display based on the program stored in said second game program storage, and generates display data for the multiplayer interactive game to be displayed on said common display, in response to the information corresponding to said units stored in said temporary storage and received from said portable game machines and outputs of said operating devices of said portable game machines,
wherein said first processor changes an image displayed on said discrete display in response to an operation of the operating device of a corresponding one of said plurality of portable game machines, and
said second processor changes an image displayed on said common display in accordance with operations of said plurality of portable game machines, whereby said video game machine and said plurality of portable game machines interact at the substantially same time to execute the multiplayer interactive game,
wherein said information corresponding to said units includes kind information indicating characters of the units, status information indicating states of the units, and coordinates information indicating display positions of the units.

8. A combined game system for playing a multiplayer interactive game, the combined game system including a video game machine providing a common display and connected through at least one communications link with a plurality of portable game machines each having a discrete display,
each said portable game machine comprising:
an operating device for outputting an operation signal depending upon an operation for a game;
a first game program storage for storing a portable game program for execution on said portable game machine;
a first processor that generates first display data to be displayed on said portable game machine discrete display based on an output of said operating device and the portable game program, and processes information associated with units used in the multiplayer interactive game for interacting with said video game machine; and
a data transceiver for transmitting said information associated with said units to and receiving said information associated with said units from said video game machine via said communications link;
said video game machine comprising:
a second game program storage for storing an operation program for said video game machine and a program for an interactive game;
a temporary storage for temporarily storing information associated with said units transmitted to said plural portable game machines through said communications link and said data transceiver and temporarily storing information associated with said units received from said portable game machine through said communications link and said data transceiver, and also for temporarily storing an output of said operating device; and a second processor that generates second display data to be displayed on said common display based on the program stored in said second game program storage, and generates display data for the multi-player interactive game to be displayed on said common display, in response to the information associated with said units stored in said temporary storage and received from said portable game machines and outputs of said operating devices of said portable game machines, wherein said information associated with said units includes kind information indicating characters and three dimensional coordinates information indicating display positions within a three dimensional display space.

* * * * *